United States Patent

[11] 3,536,200

[72] Inventors Dominick Gigliotti
 Wilmington, Delaware, and
 Drexel Kermit Smith, Richmond, Virginia
[21] Appl. No. 800,096
[22] Filed Feb. 18, 1969
[45] Patented Oct. 27, 1970
[73] Assignee E. I. du Pont de Nemours and Company
 Wilmington, Delaware
 a corporation of Delaware

[54] FILTER ASSEMBLY HAVING TAPERED HOUSING AND INLET TUBE
 4 Claims, 4 Drawing Figs.
[52] U.S. Cl. .................................................. 210/345,
 210/438
[51] Int. Cl. ...................................................... B01d 25/26
[50] Field of Search .......................................... 210/137,
 343, 345, 438

[56] References Cited
UNITED STATES PATENTS
1,676,268  7/1928  Lipscomb .................. 210/438X Primary Examiner—Reuben Friedman
Assistant Examiner—Frank A. Spear, Jr.
Attorney—Howard P. West, Jr.

ABSTRACT: A polymer filter having an inlet and outlet, the inlet being in communication with a feed passage separated from a collector passage by a filter means. The collector passage is in communication with the outlet. The feed passage diminishes in size while the collector passage increases in size in the direction of flow with the total cross-sectional area of the passages being substantially the same at any location along the filter axis. The filter means preferably is a series of stacked filter elements. The particular structural relationship between the feed and collector passages allows all the polymer to flow through the filter elements in an essentially equivalent path at an essentially equivalent rate.

Patented Oct. 27, 1970 3,536,200

INVENTORS
DOMINICK GIGLIOTTI
DREXEL KERMIT SMITH

BY Howard P. West Jr.

ATTORNEY

INVENTORS
DOMINICK GIGLIOTTI
DREXEL KERMIT SMITH

BY Howard P. West Jr.

ATTORNEY

3,536,200

FILTER ASSEMBLY HAVING TAPERED HOUSING AND INLET TUBE

BACKGROUND OF THE INVENTION

This invention relates to a device for filtering molten polymeric material. More particularly, the invention is concerned with a novel device for uniform treatment of polymer during a filtration step.

During the manufacture of shaped structures from synthetic polymers, such as polyamides and polyesters, it is customary to filter molten polymer to remove particulate matter and nonhomogeneities caused by thermal degradation of the macromolecules. Preferably, the length of time the polymer is retained in the filter will be kept to a minimum and the polymer will flow through the filter in a streamlined and uniform manner.

For effective and efficient filtration it will be desirable to use a filter having a plurality of filter elements. Uniformity of the filtered product requires that the molten polymer be fed to, filtered in and removed from the individual filter elements in an essentially equivalent manner. Filtering devices of the prior art do not lead to the desired treatment.

SUMMARY OF THE INVENTION

The present invention provides for filtering molten polymer by feeding the polymer through a filter along passages having a particular structural relationship with the filter to allow all of the polymer to flow through the filter in an essentially equivalent path at an essentially equivalent rate. This is accomplished in an apparatus that comprises a container open at one end and closed at the other end to form an elongated chamber within the container. The chamber gradually increases in cross-sectional area throughout its length from the open to the closed end. A removable cover with inlet and outlet passages therein is attached to the open end of the container. A hollow tube is attached to the cover and projects coaxially into the chamber. The tube is in communication with the inlet in the cover and has an outside diameter that increases along its projected length. A means for filtering liquid coaxial with, spaced from and supported by the tube is positioned in the chamber. The tube and the filter divide the chamber into a feed passage in communication with the inlet through the hollow tube and a collector passage in communication with the outlet. The feed and collector passages have an inverse cross-sectional area relationship and the sum of the cross-sectional areas of these passages is substantially the same at any common point along their length. The filter means is arranged as a series of stacked individual filter elements. All of the polymer flowing through the individual filter elements will follow an essentially equivalent path and will travel at an essentially equivalent rate and, therefore, all portions of polymer passing through the filter will have experienced the same holdup time regardless of the point of entry into the stack of filter elements.

DESCRIPTION OF THE ILLUSTRATED EMBODIMENTS

Figure 1:
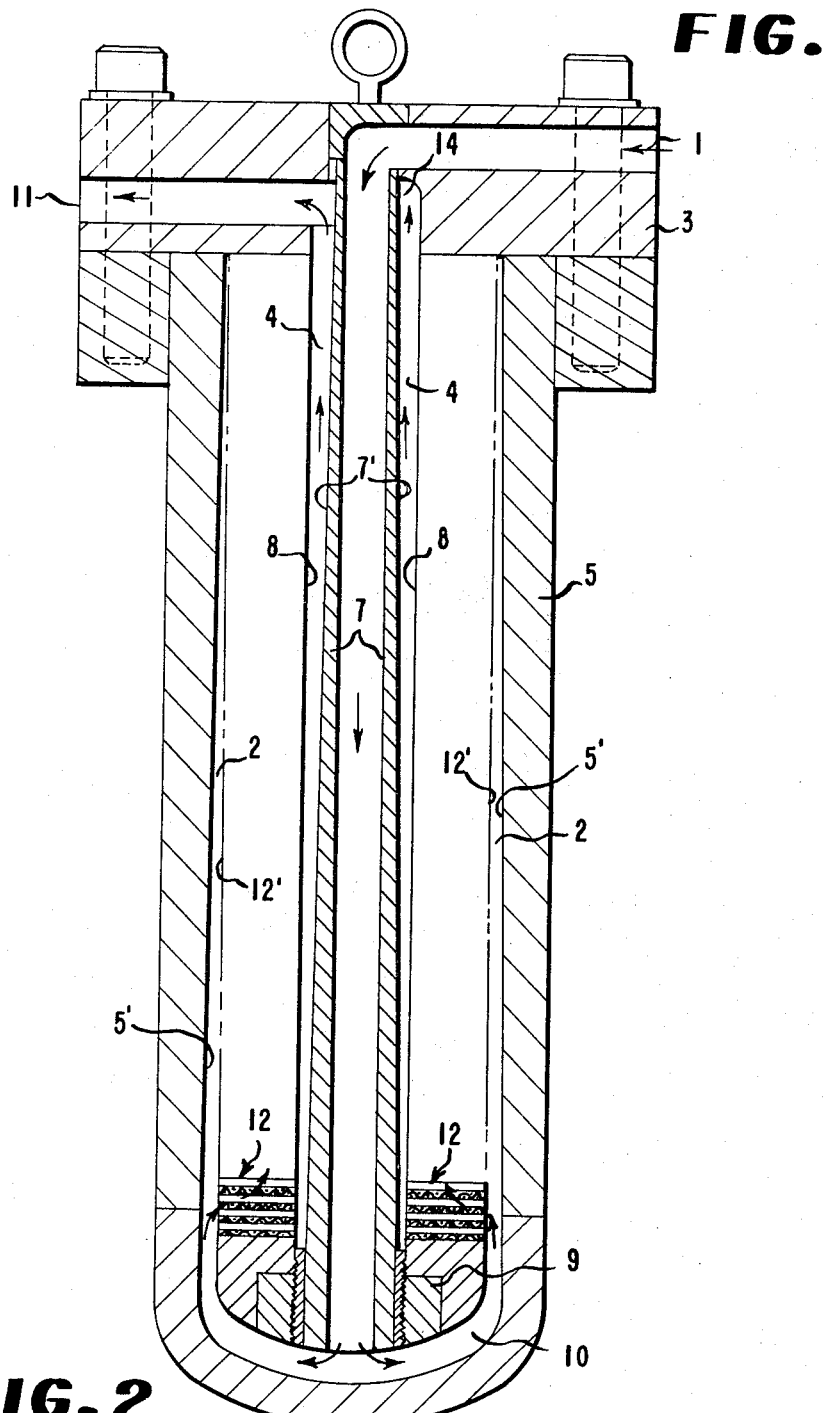
FIG. 1, is a sectioned elevation of a generally cylindrical filtering apparatus illustrating a preferred embodiment of the invention.

Referring to FIG. 1, the apparatus of this invention generally includes a filter pot 5 provided with a removable cover 3, a filter means 12 positioned within pot 5 and a tube 7 attached at one end to cover 3 with a support 9 threaded to the other end of tube 7. Cover 3 has an inlet passage 1 in communication with tube 7 and an outlet passage 11 in communication with cavity 14 around tube 7 at its upper end in cover 3. Delivery tube 7 increases in outside diameter along its projected length and the outside surface 7' of tube 7 along with the inside surface 8 of filter means 12, defines collector passage 4. The inside diameter of filter pot 5 increases in a gradual taper from the top to the section corresponding to the flat surface of support 9 for the filter means. The inside tapered surface 5' of filter pot 5, in conjunction with the outside surface 12' of filter means 12, defines feed passage 2. From the bottom of the tapered section 5', the inside of filter pot 5 is rounded, and with the rounded surface of support 9 defines connecting passage 10 between delivery tube 7 and tapered passageway 2.

This particular structural arrangement provides a feed passage 2 of diminishing size and a complementary collector passage 4 of increasing size in the direction of flow. The total cross-sectional area of the feed and collector passages along any plane perpendicular to the central axis of the filter apparatus is constant.

Figure 2:
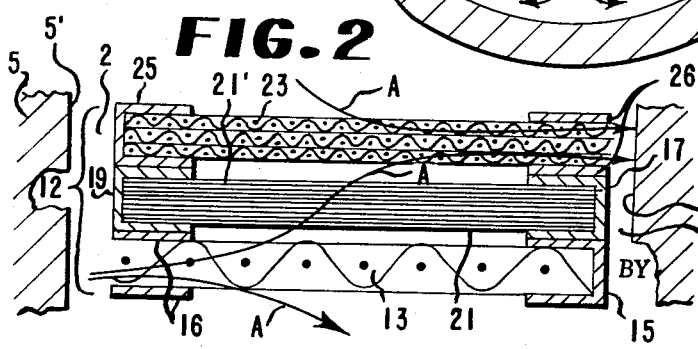
FIG. 2 is an enlarged partial schematic sectioned view of one form of the filter means.

In FIG. 2, filter means 12 is illustrated in the form of an assembly of screens. Alternatively, the filter means 12 may utilize a sintered metal disc in place of one or more of the screens. The filter means 12 is in the shape of a cylinder with a bore through its center and, accordingly, a cross-sectional view along a diameter will consist of two separate halves, of which, for convenience, only one is shown. The actual filtration medium or elements comprise a stack of about 15 layers of 325 × 325 mesh fine stainless steel wire screens 21, 21'. The stack is maintained as an integral unit by an inner screenholder 17 and an outer screenholder 19. On the high pressure side of screens 21, there is a spacer 13 of coarse 4 × 4 mesh screen. The screen is constrained at the inner diameter by a closed clamp 15 and at the outer diameter by spacer rings 16. The outer diameter of spacer 13 is open to permit entry of unfiltered material. On the downstream side of screens 21, a backup spacer 23 is provided which is composed of several layers of coarse 10 × 10 mesh screens. These screens are clamped together at the outer diameter by a holder 25 with the inner diameter left open between spacer rings 26 to permit the filtered material to pass into a collection passageway (not shown). The spacer screens on the downstream side of the screens 21 are considerably finer than those in spacer 13. The slightly finer mesh provides structural support for the screens 21 and thus prevents excessive buckling under the high operating pressure. The mesh however is sufficiently coarse so not to interfere with the flow of the filtered material. The path of polymer flow is indicated by arrows A.

Figure 3:
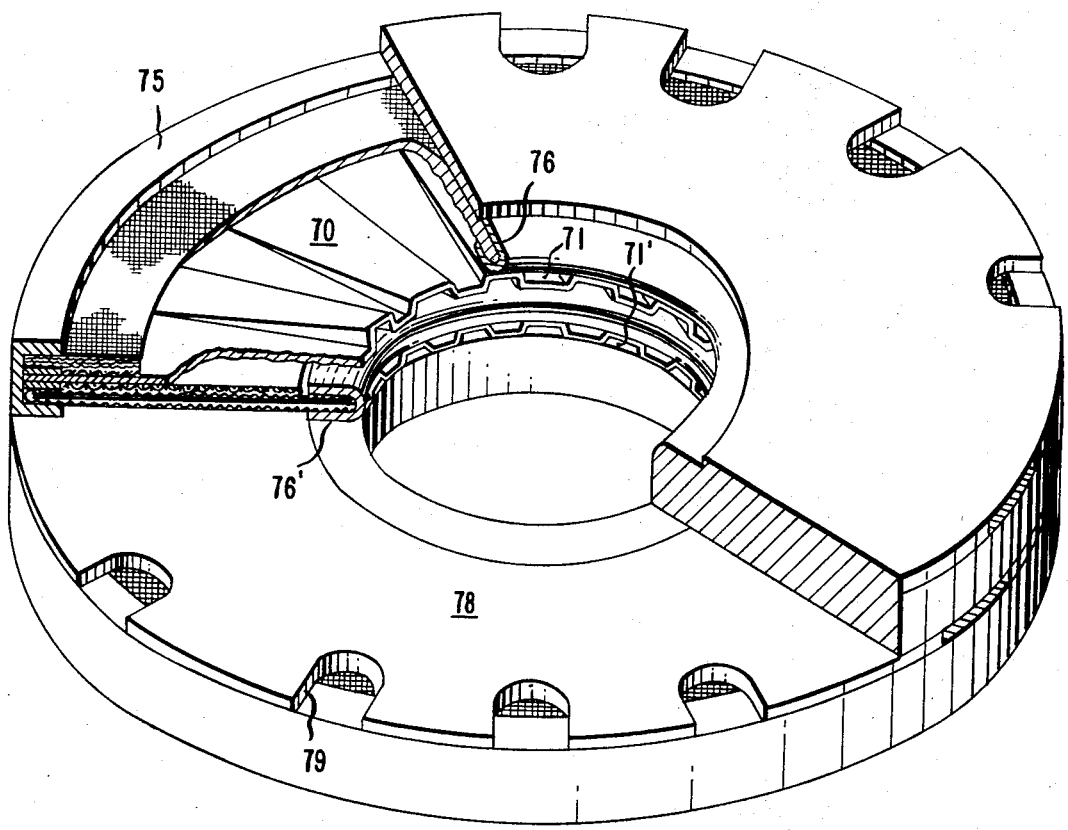
FIG. 3 is a perspective view, partially in section of another form of an element of the filter assembly.
Figure 4:
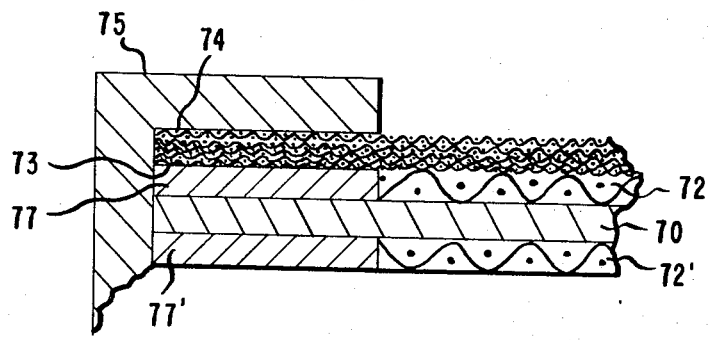
FIG. 4 is an enlarged partial view of the screen assembly of the filter element shown in FIG. 3.

An alternate arrangement for the embodiment represented by FIG. 2 is the filter assembly and feed plate shown in FIGS. 3 and 4. Referring to FIG. 3, each filter assembly contains a collector disk 70 which is an essentially flat waferlike member modified to contain radial grooves such as 71 and 71' for conveying the filtered polymers from the screens to the collector passageway 4. Grooves 71, 71' blend into the flat portion of disk 70 at the outer diameter and continuously increase in depth to a maximum at the inner diameter. Each disk 70 is constructed from stainless steel stock sheet with 72 radial grooves press formed so that there are 36 to a side. Each side of disk 70 is faced with a relatively coarse, stainless steel support screen 72 and 72' which supports sets of fine screens 73. Support screens 72 and 72' are relatively rigid elements that protect the fine screens from distorting and collapsing into the grooves under operating conditions. There are 15 screens in each set of fine screens 73. Each screen is made from 0.0014 inch (0.0035 centimeter) diameter stainless steel wire woven into a 325 × 325 mesh. It is to be noted that the number of screens in each set may be altered as desired. In the preferred embodiment, 15 layers are used to insure that the polymeric material is subjected to sufficient shear. This treatment is believed to improve the uniformity of the material. Protective screens 74 are made from 0.009 inch (0.023 centimeter) diameter stainless steel wire woven into a 50 × 50 mesh and serve to shield the fine screens from large particles of impurities on the high pressure side of the filtration assembly. The screens are constrained in a large clamping collar 75 at their outer diameter and are secured in two groups by pinch collars 76 and 76' at the inner diameter. The outer periphery of the screens and the collector disk are pressed together tightly within clamping collar 75 and form a fluid-tight seal. To improve the effectiveness of the seal, the relatively coarse support screens 72 and 72' terminate short of collar 75 and abut with solid spacer rings 77 and 77'. These rings are made of a soft metal such as aluminum and act as gaskets that deform under the high pressing force imposed on the collar 75 during assembly. In the stacked condition, a specially designed feed plate 78 is employed to balance out the height difference between the inside and outside of the assembly. Feed plate 78 is a flat annular disk-shaped member equal in thickness to the height difference between the outer and inner diameters of the filter assembly. In the preferred embodiment, this amounts to about twice the gauge thickness of a pinch collar. The outer periphery of feed plate 78 is modified at regular intervals by input apertures 79 through which polymer is introduced from passage 2 (FIG. 1) into the screens 74 and 74'. In the assembled condition, the feed plate abuts with the edges of the pinch collars at the inner diameter side, and is interposed between adjacent collars 75.

In operation of the apparatus (FIG. 1) molten polymer is pumped, under pressure, to polymer inlet 1 and passed through delivery tube 7 to the bottom of the filter pot. As the polymer moves along feed passageway 2, portions of the molten mass pass through filter means 12. As a consequence of the diminishing size of feed passage 2, the polymer flow is maintained at a relatively uniform rate since the size of the passage is related to the fraction of the filter means to be supplied with polymer. After the polymer passes through the filter means, it enters tapered passage 4 which increases in size in relation to the amount of polymer entering the passageway and, again, uniformity of flow is maintained. Further, since the total feed and collector passage cross-sectional area along any plane perpendicular to the axis of the filter is constant the diminishing size of the feed passage 2 is accompanied by an essentially equivalent increase in size of the collector passage 4 and this condition is also needed for uniformity of polymer flow. When optimum results are required, the nonfilter walls of passages 2 and 4 will have a parabolic curvature and be in a diverging relationship in the direction of polymer flow. Because of the difficulty in forming walls having a parabolic curvature, it may be desirable to use straight-walled passageways wherein the nonfilter walls are in a diverging relationship in the direction of polymer flow and filters having straight-walled passageways have been found to provide a useful result. Transfer cavity 14 serves to funnel the flowing polymer to outlet 11. Transfer cavity 14 may be conelike in shape with the largest diameter at its entrance.

The filter means 12 may utilize any of the filter media known to the art of polymer filtration that can be utilized as a series of like elements. Thus, it may comprise sintered or porous metal, or a metal plate containing drilled or etched holes. The filter media may comprise layers of sand of decreasing grain size or stacks of screens having an increasing fine mesh or both. Screens are an especially preferred filter media.

The components of the device may be fabricated from corrosion-resistant metal such as stainless steel, and the device will preferably be supplied with a heating jacket and appropriate rings and brackets to facilitate handling and mounting.

We claim:

1. A liquid filtering apparatus comprising:
   a. a sealed container having inlet means, an outlet at one end and an elongated chamber generated about a central axis therein, said chamber increasing in cross-sectional area from said one end to form a tapered inner surface, said inlet means projecting coaxially into said chamber, said inlet means being tubular in form and having an outside diameter that gradually increases along its projected length; and
   b. means for filtering liquid positioned in said chamber between said inlet means and said tapered inner surface, said filtering means and said inlet means separating said chamber into feed and collector passages axially oriented in said chamber and in communication with said inlet means and said outlet means respectively, the sum of the cross-sectional areas of said feed and collector passages being substantially the same at all points along their length.

2. The apparatus of claim 1 said filtering means comprising a plurality of layers of filter media, said layers being oriented in a plane perpendicular to the central axis of the chamber.

3. A liquid filtering apparatus comprising:
   a. container, said container being open at one end and closed at the other end to form an elongated chamber generated about a central axis therein, said chamber increasing in cross-sectional area from said one end to said other end;
   b. a removable cover attached to said one end, said cover having inlet and outlet passages therein;
   c. a hollow tube attached to said cover and in communication with said inlet projecting coaxially into said chamber, said tube having an outside diameter increasing along its projected length; and
   d. a means for filtering liquid positioned in said chamber around said tube, said means being coaxial with and spaced from said tube substantially throughout its length, said means and said tube dividing said chamber into a feed passage in communication with said inlet through said hollow tube and a collector passage in communication with said outlet, said passages having an inverse cross-sectional area relationship and the sum of the cross-sectional areas of the feed and collector passages being substantially the same at any common point along their length.

4. The apparatus of claim 3, said filtering means comprising a plurality of separated layers of screens, said layers being aligned in planes substantially perpendicular to the central axis of the chamber.